April 17, 1945.  E. D. WHITE  2,373,728
MEANS FOR PREVENTING OVERHEATING IN AIRCRAFT DEICING SYSTEM
Filed March 31, 1944
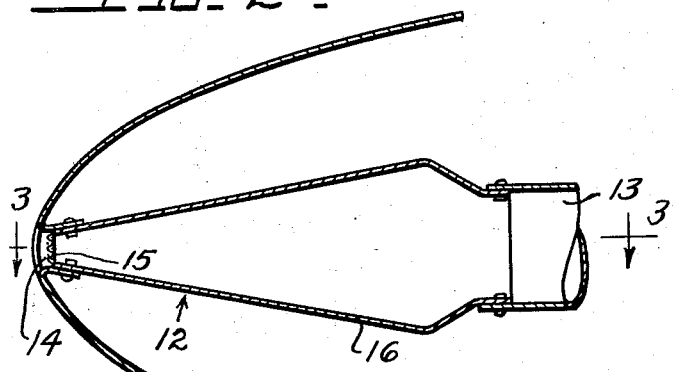
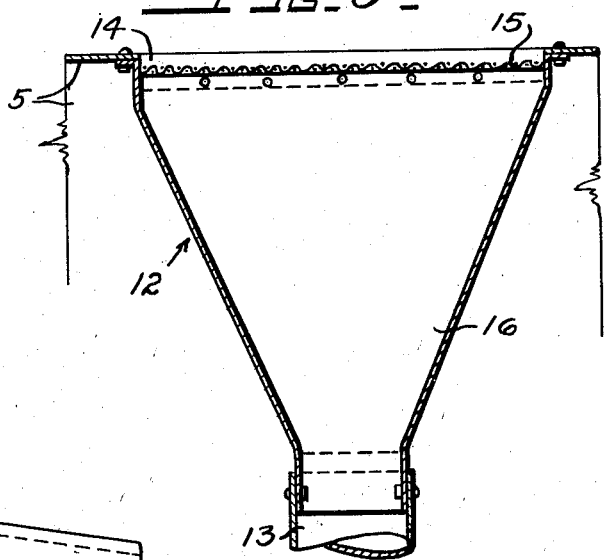
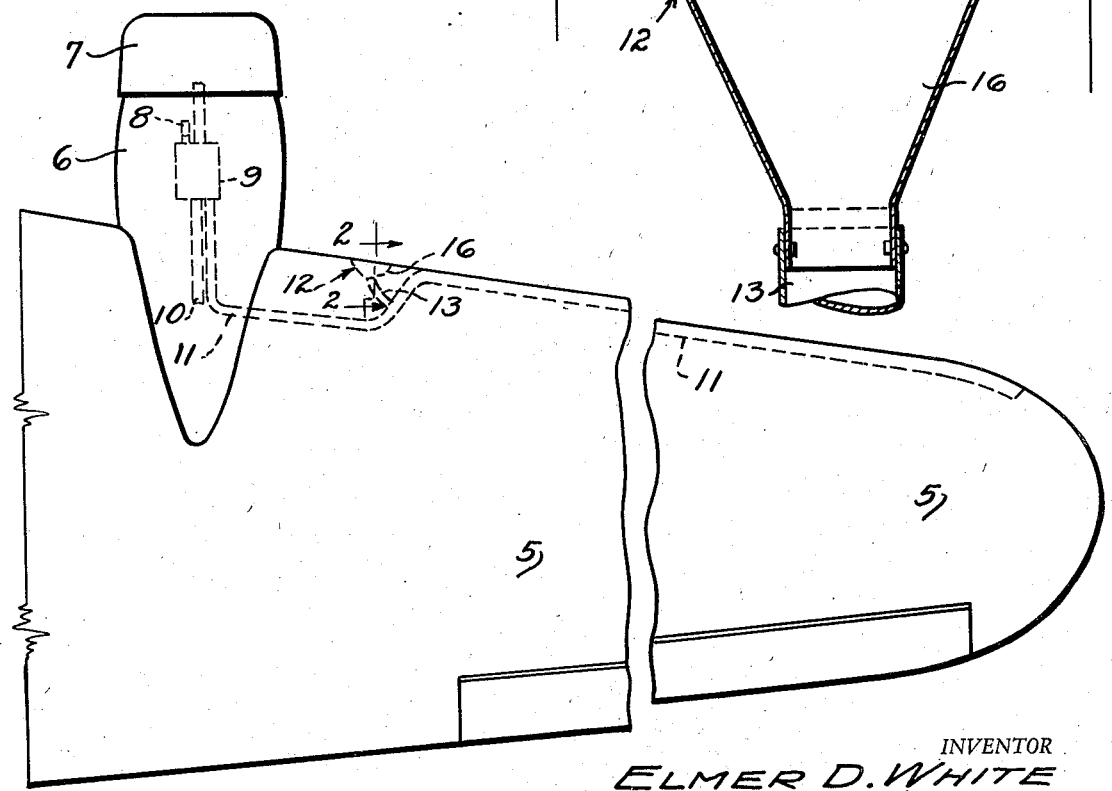
INVENTOR
ELMER D. WHITE
BY
ATTORNEYS Patented Apr. 17, 1945

2,373,728

UNITED STATES PATENT OFFICE 2,373,728

MEANS FOR PREVENTING OVERHEATING IN AIRCRAFT DEICING SYSTEMS

Elmer D. White, Dayton, Ohio

Application March 31, 1944, Serial No. 528,917

3 Claims. (Cl. 244—134)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for preventing overheating in aircraft de-icing systems for wings and the like.

In existing wing de-icing systems, air entering a forward facing ram is heated by being passed through a heat exchanger and then is led through a conduit or passageway adjacent the leading edge of the wing, which by conduction is heated far above the freezing point. A considerable excess of heat must be conducted to the leading edge to insure quick melting of ice layers, which usually build up with extreme rapidity once the ice starts to form, and if allowed to build up will force the pilot to abandon his plane or attempt a crash landing. However, air at high temperatures has damaging or even destructive effects on portions of the wing, which is necessarily made of thin metal or other light weight parts. This invention aims to provide a practicable construction and arrangement of parts which will permit adequate heating of the leading edge of a wing, while obviating excessive or destructive heating. More specific objects are to provide apparatus of the character indicated which will not add materially to the weight of an airplane, which is easily made and installed, which has few parts and none likely to give service troubles, which is automatic in action, and which requires few changes in the wing structure to permit installation. Other objects and advantages will be understood from the following description of the preferred embodiment of the invention shown in the accompanying drawing, wherein Fig. 1 is a fragmentary plan view of an airplane wing equipped with apparatus for de-icing its leading edge, said apparatus being shown in dotted lines and including the improvement herein claimed;

Fig. 2 is an enlarged vertical cross section on lines 2—2 of Fig. 1; and

Fig. 3 is a section on line 3—3 of Fig. 2, but turned so that the left end of Fig. 2 is uppermost in Fig. 3.

Referring particularly to the drawings, the illustrative airplane wing 5 has a nacelle 6 housing an engine (not shown) and a cowling 7 adjacent a propeller, also not shown. A cold air intake 8 leads to an exhaust air heater 9, which is of conventional construction and requires no description. The exhaust pipe 10 of the engine is also indicated. Air heated within heater 9 is forced through a conduit 11 which extends to the leading edge of the wing and may terminate at the wing tip as shown, where the heated air, now greatly cooled, will exhaust into the atmosphere. The parts so far described are so well known as to require no further description or illustration.

According to the invention, an additional air ram 12, located on the leading edge of the wing preferably in the propeller slip stream, has a conduit 13 connecting with the conduit 11, and thus causing a considerable volume of cold air to mix with the hot air passing through conduit 11, thereby to reduce the temperature of the heated air to a point where no damage to the wing can result. This mixing of cold air with the heated air is continuous and automatic, requiring no power or manipulation of controls etc., but takes place only while the passageway or slot 14 is open. Supported in slot 14 is a wire screen 15 which prevents insects, gravel etc. from entering the air conduit, and also facilitates the formation of a layer of ice when icing conditions exist. Once a layer of ice covers the screen, all flow of cold air into conduit 13 ceases, and the heated air is undiluted with cooling air as it passes through conduit 11, hence the leading edge of the airplane wing is subjected to the full heating effect of the de-icing apparatus. This continues as long as the icing conditions persist; but when the airplane passes into another zone and icing no longer occurs, heat conducted from conduit 11 to conduit 13 will be transferred to screen 15 through the metal walls of the air inlet chamber 16 which connects the air slot 14 with conduit 13. The ice clogging screen 15 will thus be slowly melted, and the rush of air through the screen may hasten the removal of the ice by carrying away or evaporating surface moisture. When the cold air starts flowing through the air inlet 14, the temperature of the conduit 13 will immediately drop and will continue to drop as the air inlet is further opened by melting of the ice.

With the described apparatus, the pilot or engineer need only connect the air heater when icing conditions are likely or possible, and the apparatus will automatically function as explained without any attention or control. The attachment may be designed so as to be of light weight and will not detract materially from the performance of the airplane.

Obviously some changes may be made in the described apparatus, within the scope of the appended claims. In some instances additional heat-conducting members may connect conduit 11 with the screen or its mounting, so as to conduct enough heat to the screen to insure melting of the ice, once the icing zone has been left behind.

What I claim is:

1. In combination with a de-icing system for aircraft having wings comprising an air heater and a conduit connected to the heater and being located at or adjacent the leading edge of a wing, but within the wing, said conduit being adapted to conduct air heated by the heater along the major portion of the length of the wing, that improvement which consists in the provision of a cold air duct within the wing and communicating with an air slot which is formed at the leading edge of the wing and which discharges into the conduit when unobstructed; and means constructed and arranged to pass air therethrough but facilitating the quick formation thereon of a layer of ice, such as will obstruct or prevent flow of air from the air slot through the duct into the conduit, whenever the aircraft enters an icing zone; said means being located at the entrance to the cold air duct and being formed of heat-conducting material and being subjected to heat conducted from the hot air conduit so that ice forming thereon will be slowly removed by melting when the icing zone has been left behind.

2. The invention according to claim 1, wherein said means is a metallic screen of good heat conductivity.

3. In an aircraft wing de-icing system of the type employing a hot air conduit extending adjacent to the leading edge of the wing, that improvement which comprises a cold air inlet and conduit permanently connected with the hot air conduit to continuously discharge cold air directly into the hot air conduit during flight of the aircraft through non-icing zones; and means in said inlet to facilitate quick building of an air-obstructing layer of ice within the inlet; said means being heat-conductive and being located and supported so that a continuous flow of heat is conducted thereto from the hot air conduit but at a rate insufficient to prevent building up of the ice layer when the aircraft encounters icing conditions.

ELMER D. WHITE.